US009687866B1

(12) United States Patent
Chan

(10) Patent No.: US 9,687,866 B1
(45) Date of Patent: Jun. 27, 2017

(54) LIQUID SOAP DISPENSER

(71) Applicant: LIVING FOUNTAIN PLASTIC INDUSTRIAL CO., LTD., Taichung (TW)

(72) Inventor: Ching-Chung Chan, Taichung (TW)

(73) Assignee: LIVING FOUNTAIN PLASTIC INDUSTRIAL CO., LTD., Taichung (TW)

( * ) Notice: Subject to any disclaimer, the term of this patent is extended or adjusted under 35 U.S.C. 154(b) by 7 days.

(21) Appl. No.: 15/047,973

(22) Filed: Feb. 19, 2016

(51) Int. Cl.
*G01F 11/00* (2006.01)
*B05B 11/00* (2006.01)
*B05B 15/00* (2006.01)

(52) U.S. Cl.
CPC ...... *B05B 11/3001* (2013.01); *B05B 11/3047* (2013.01); *B05B 15/005* (2013.01)

(58) Field of Classification Search
CPC B05B 11/3001; B05B 11/3047; B05B 15/005
USPC ............ 222/321.7–321.9, 321.1, 321.3, 320, 222/153.13
See application file for complete search history.

(56) References Cited

U.S. PATENT DOCUMENTS 5,443,569 A * 8/1995 Uehira .................. B05B 7/0031 222/190
6,230,942 B1 * 5/2001 Kuo .................... B05B 11/0016 222/321.9
6,695,176 B1 * 2/2004 Nazari .................. B05B 11/007 222/321.9
6,966,459 B1 * 11/2005 Tseng .................... B05B 11/306 222/153.13
7,168,594 B2 * 1/2007 Law ...................... B05B 11/306 222/153.13
7,748,576 B2 * 7/2010 Tseng .................. B05B 11/3023 222/321.2
9,199,257 B2 * 12/2015 Wang .................. B05B 11/3001
2002/0056731 A1 * 5/2002 Shimada ............. B05B 11/0062 222/321.9
2008/0290119 A1 * 11/2008 Tseng .................. B05B 11/3001 222/321.7
2009/0314805 A1 * 12/2009 Ding ..................... B05B 11/306 222/153.13
2010/0006604 A1 * 1/2010 Ding ..................... B05B 11/007 222/320
2012/0305604 A1 * 12/2012 Wang .................. B05B 11/3023 222/321.9

* cited by examiner

*Primary Examiner* — Lien Ngo
(74) *Attorney, Agent, or Firm* — Egbert Law Offices, PLLC

(57) ABSTRACT

A liquid soap dispenser includes a cap adapted to be mounted onto a container. A cylinder longitudinally and rotatably extends through the cap. A tube is longitudinally connected to a lower end of the cylinder. A discharge tube is partially longitudinally received in the cylinder. The discharge tube has a lower end received in the cylinder and abutting against an inner periphery of the cylinder and is reciprocally moved relative to the cylinder. A push-button is mounted onto a top of the discharge tube. A negative pressure relative to the space in the container is intermittently formed in the cylinder such that the liquid soap in the container will sequentially pass through the tube, the discharge tube and the push-button when the push-button is reciprocally pressed and the piston of the discharge tube is reciprocally moved relative to the cylinder.

2 Claims, 8 Drawing Sheets

LIQUID SOAP DISPENSER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a liquid dispenser, and more particularly to a liquid soap dispenser with a function of preventing from inflowing water.

2. Description of Related Art Including Information Disclosed Under 37 CFR 1.97 and 37 CFR 1.98.

A container is usually provided for containing thick liquid, such as liquid soap or shampoo, in our daily life. A cap is mounted on a top of the container form closing the container. For conveniently draining the thick liquid from the container, a pushing type liquid dispenser is provided and extends through the cap such that the operator does not need to repeatedly open/close the cap. However, the conventional liquid dispenser is not good enough.

A conventional liquid dispenser in accordance with the prior art shown in FIG. 6 comprises a cap 80 is mounted onto a container (not shown) for closing an opening defined in a top of the container. A cylinder 81 longitudinally extends through the cap 80 and a tube 82 is longitudinally connected to a lower end of the cylinder 81. A discharge tube 83 is partially longitudinally received in the cylinder 81, wherein the discharge tube 83 has a lower end abutting against an inner periphery of the cylinder 81 and reciprocally moved relative to the cylinder 81. A push-button 84 is mounted onto a top end of the discharge tube 83. A negative pressure is intermittently formed in the cylinder 81 when the operator repeatedly presses the push-button 84 and the discharge tube 83 is reciprocally moved relative to the cylinder 81. As a result, the thick liquid in the container is drained from the push-button 84 after sequentially passing through the tube 82 and the discharge tube 83. For reducing the volume during being transported of preventing the push-button 84 from an error operation, a threaded hole 85 is defined in a top of the cylinder 81 and an outer threaded portion 86 is formed on a lower section of the push-button 84. Consequently, the distance between the push-button 84 and the cap 80 is minimized when the outer threaded portion 86 is screwed into the threaded hole 85. However, the outer threaded portion 86 and the threaded hole 85 are separated from each other for easily operated all the times during taking a shower such that the splashed water will flow into the container through a gap between the discharge tube 83 and the threaded hole 85, and the thick liquid in the container will be diluted.

In view of this, with reference to FIG. 7, the conventional liquid dispenser as shown in FIG. 6 is altered, wherein a tubular structure 87 vertically extends from a bottom of the threaded hole 85 and the level height of the top of the tubular structure 87 is greater than that of the top of the cylinder 81. Consequently, the splashed water will be collected in the annular room between the periphery of the threaded hole 85 and the tubular structure 87 and the collected water overflow the cap 80 because the level height of the top of the tubular structure 87 is greater than that of the top of the cap 80 such that the problem of the conventional liquid dispenser as shown in FIG. 6 is mitigated and/or obviated.

However, the conventional liquid dispenser, as shown in FIG. 7, needs two be further altered. With reference to FIG. 8, the push-button 80 of the conventional liquid dispenser provides an unexpected visual effect to the consumers because the outer threaded portion 86 is formed on the outer periphery of the push-button 84. In addition, the conventional push-button 84 usually made of plastic having a low hardness such that the outer threaded portion 86 is easily broken due to an improper impact.

The present invention has arisen to mitigate and/or obviate the disadvantages of the conventional liquid dispensers.

BRIEF SUMMARY OF THE INVENTION

The main objective of the present invention is to provide an improved liquid soap dispenser with a function of preventing from inflowing water.

To achieve the objective, the liquid soap dispenser in accordance with the present invention comprises a cap adapted to be mounted onto a container for closing an opening defined in the container. A cylinder longitudinally and rotatably extends through the cap. A tube is longitudinally connected to a lower end of the cylinder. A discharge tube is partially longitudinally received in the cylinder. The discharge tube has a lower end received in the cylinder and formed with a piston, wherein the piston abuts against an inner periphery of the cylinder and is reciprocally moved relative to the cylinder. A push-button is mounted onto a top of the discharge tube. A negative pressure relative to the space in the container is intermittently formed in the cylinder such that the liquid soap in the container sequentially passes through the tube, the discharge tube and the push-button when the push-button is reciprocally pressed and the piston of the discharge tube is reciprocally moved relative to the cylinder. The cylinder includes a cavity defined in a top thereof and a tubular structure co-axially extends from a bottom of the cavity, wherein a top of the tubular structure has a level height greater than that of the top of the cylinder. An outer threaded portion is formed on the tubular structure. The discharge tube extends through the tubular structure and an outer periphery of the discharge tube abuts an inner periphery of the tubular structure. The push-button includes a press portion. A hollow stub and a connecting tube respectively co-axially extend from a bottom surface of the press portion, wherein the hollow stub has a diameter greater than that of the connecting tube and an extending length longer than that of the connecting tube such that an altitude difference is formed between the hollow stub and the connecting tube. An inner threaded portion is peripherally formed on an inner periphery of the hollow stub within the altitude difference, wherein the inner threaded portion is selectively screwed onto the outer threaded portion for positioning the push-button on the top of the cylinder. The coupled ends of the connecting tube and the discharge tube are connected to each other. The push-button includes a dispensing passage defined in the press portion and communicating with the connecting tube for dispensing liquid soap.

Further benefits and advantages of the present invention will become apparent after a careful reading of the detailed description with appropriate reference to the accompanying drawings.

DETAILED DESCRIPTION OF THE INVENTION

Figure 1:
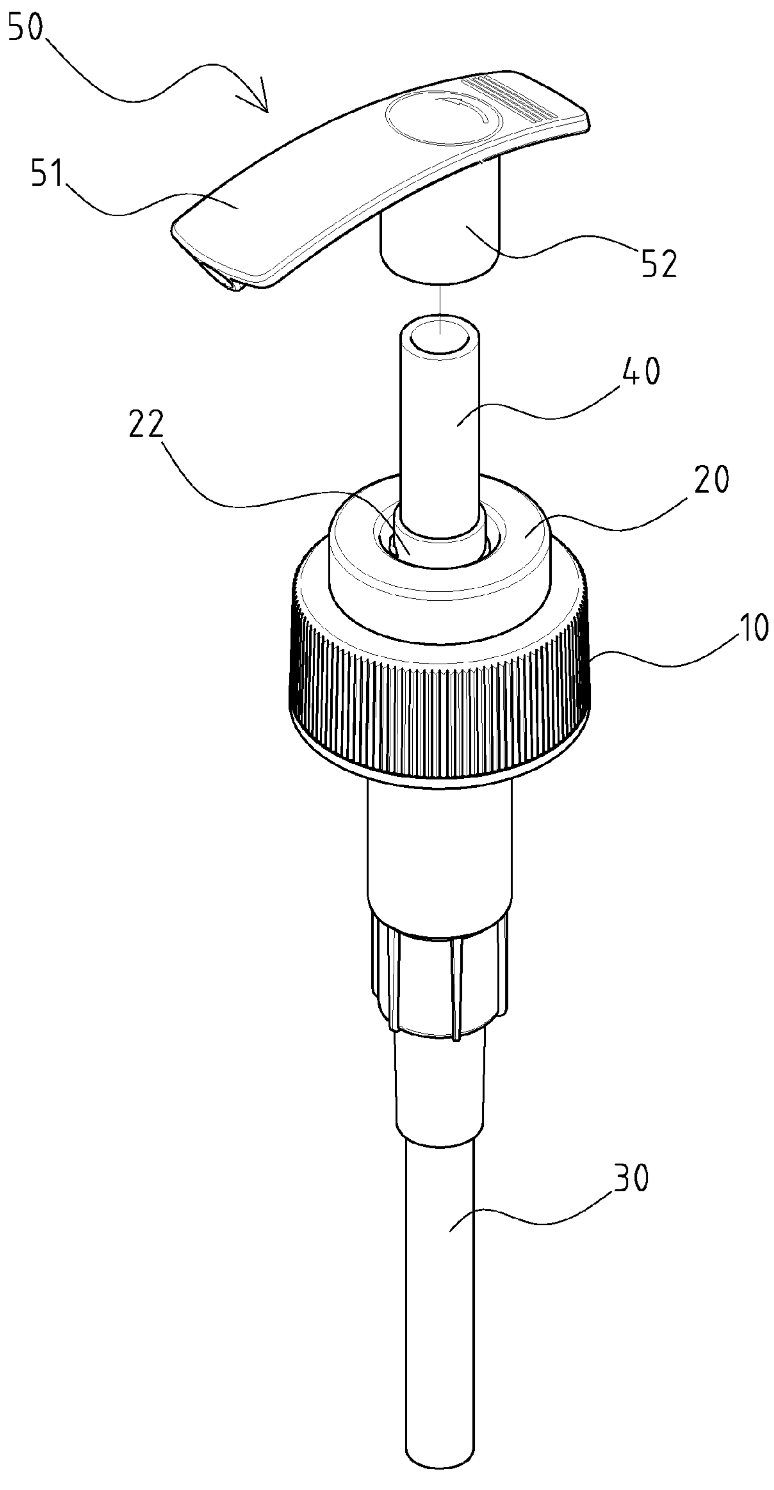
FIG. 1 is a perspective view of a liquid soap dispenser in accordance with the present invention.
Figure 2:
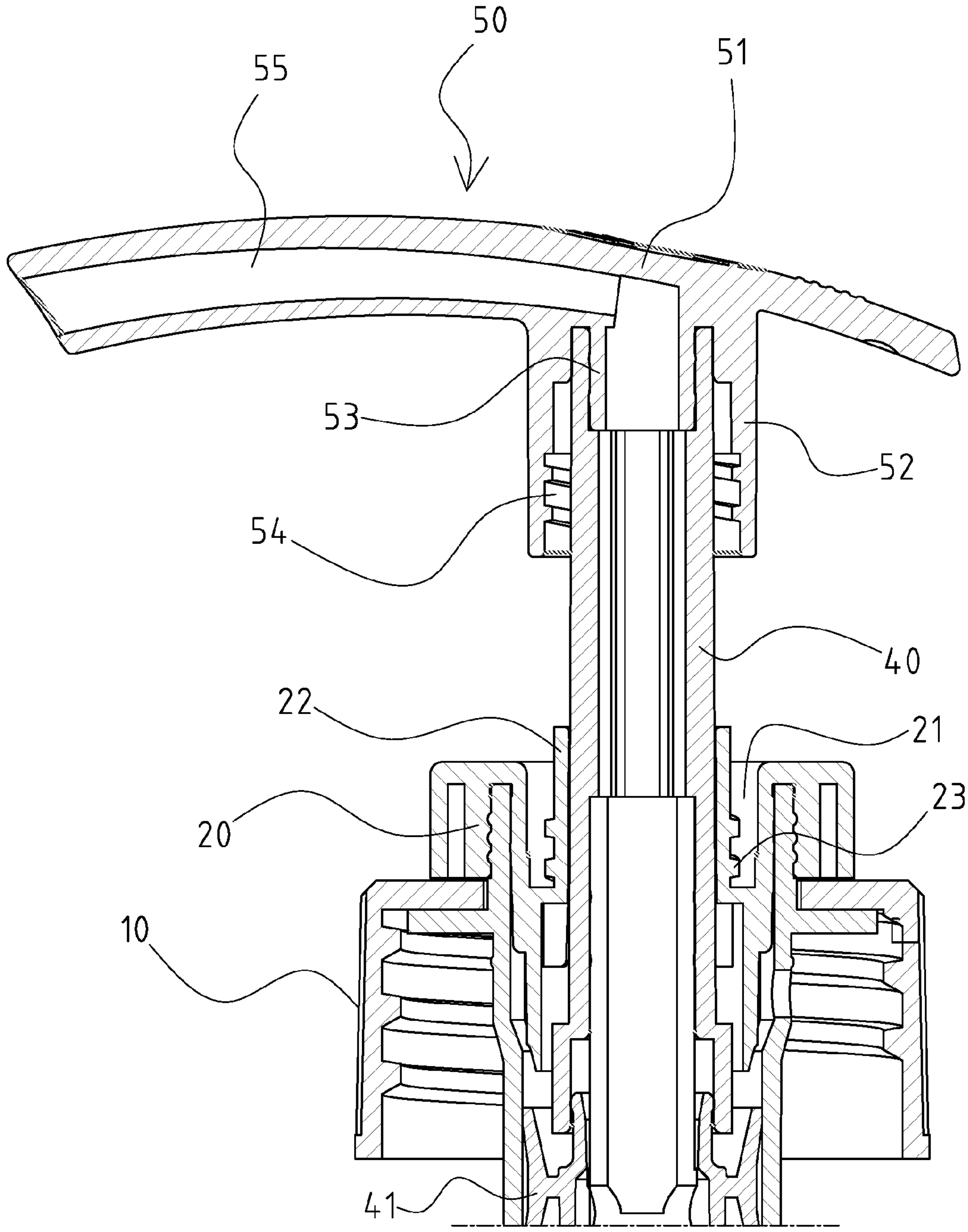
FIG. 2 is a partially cross-sectional view of the liquid soap dispenser in accordance with the present invention.
Figure 3:
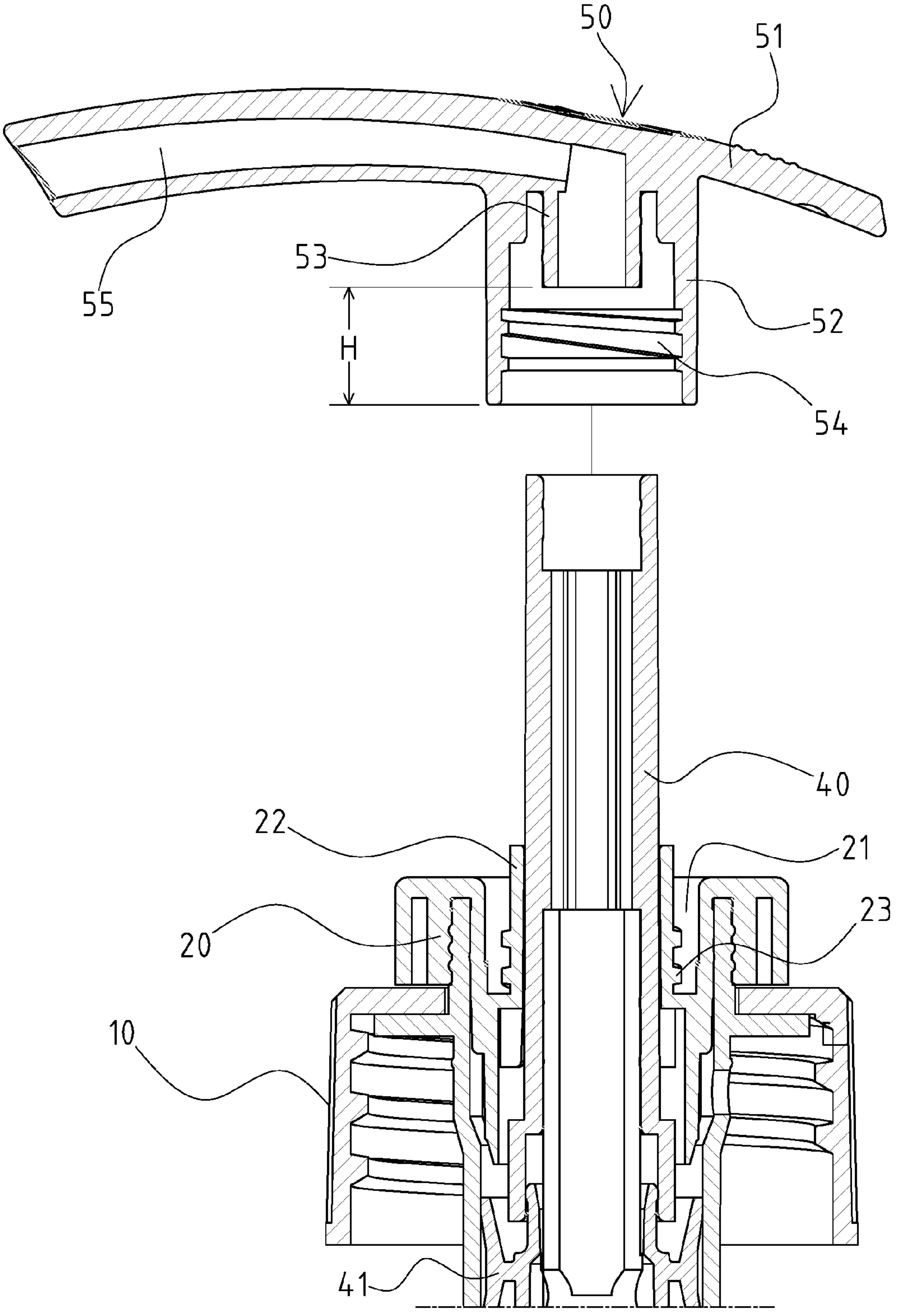
FIG. 3 is a partially cross-sectional view of the liquid soap dispenser as shown in FIG. 7.

Referring to the drawings and initially to FIGS. 1-3, a liquid soap dispenser in accordance with the present invention comprises a cap 10 adapted to be mounted onto a container (not shown) for closing an opening defined in the container. A cylinder 20 longitudinally and rotatably extends through the cap 10. A tube 30 is longitudinally connected to a lower end of the cylinder 20. A discharge tube 40 is partially longitudinally received in the cylinder 20. The discharge tube 40 has a lower end received in the cylinder 20 and formed with a piston 41, wherein the piston 41 abuts against an inner periphery of the cylinder 20 and is reciprocally moved relative to the cylinder 20. A push-button 50 is mounted onto a top of the discharge tube 40. A negative pressure relative to the space in the container is intermittently formed in the cylinder 20 such that the liquid soap in the container will sequentially pass through the tube 30, the discharge tube 40 and the push-button 50 when the push-button 50 is reciprocally pressed and the piston 41 of the discharge tube 40 is reciprocally moved relative to the cylinder 20.

The cylinder 20 includes a cavity 21 defined in a top thereof. A tubular structure 22 co-axially extending from a bottom of the cavity 21, wherein a top of the tubular structure 22 has a level height greater than that of the top of the cylinder 20. The discharge tube 40 extends through the tubular structure 22. An outer periphery of the discharge tube 40 abuts an inner periphery of the tubular structure 22. An outer threaded portion 23 is formed on the tubular structure 22.

Figure 4:
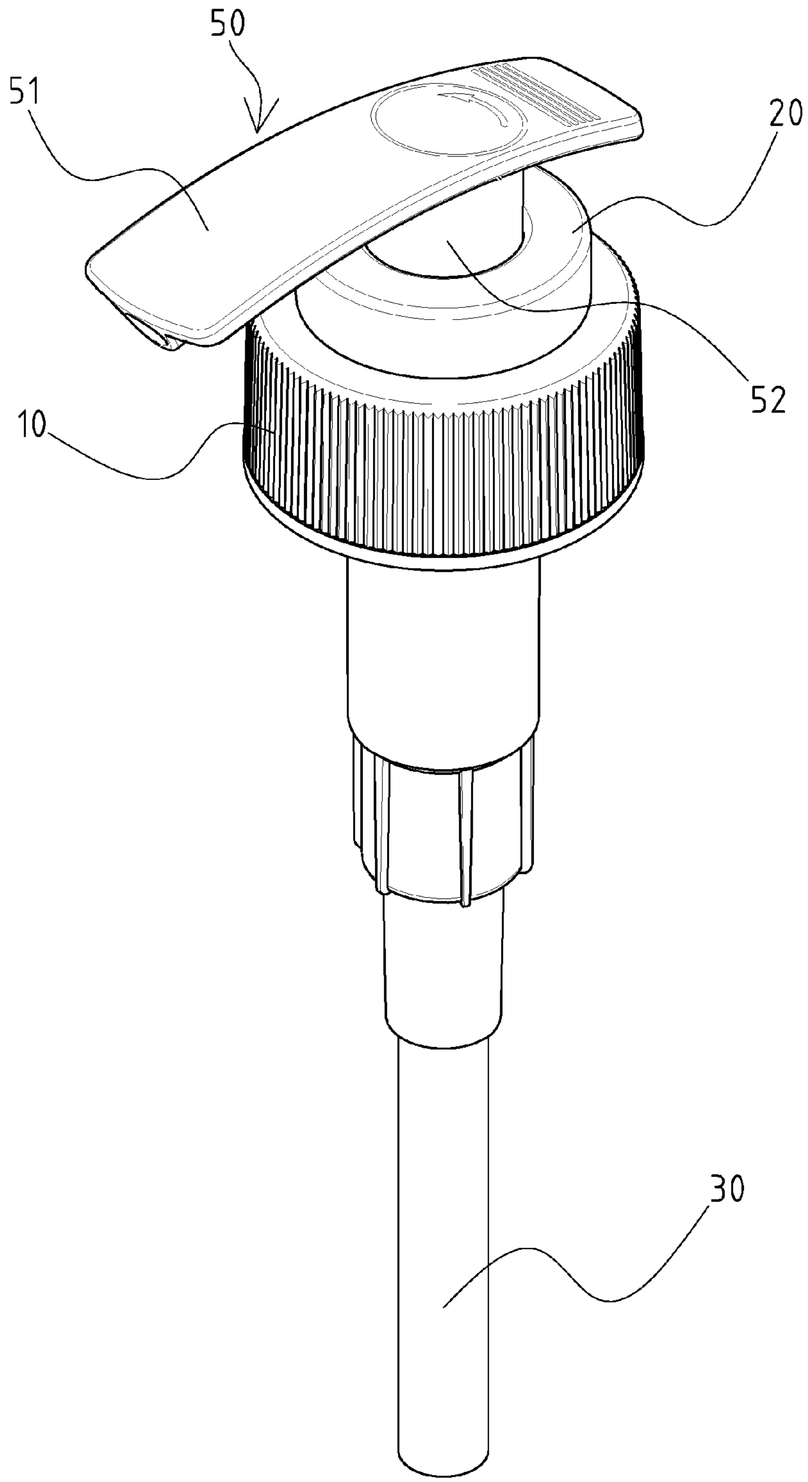
FIG. 4 is a perspective view of a liquid soap dispenser in accordance with the present invention when the push-button is mounted to the cap.
Figure 5:
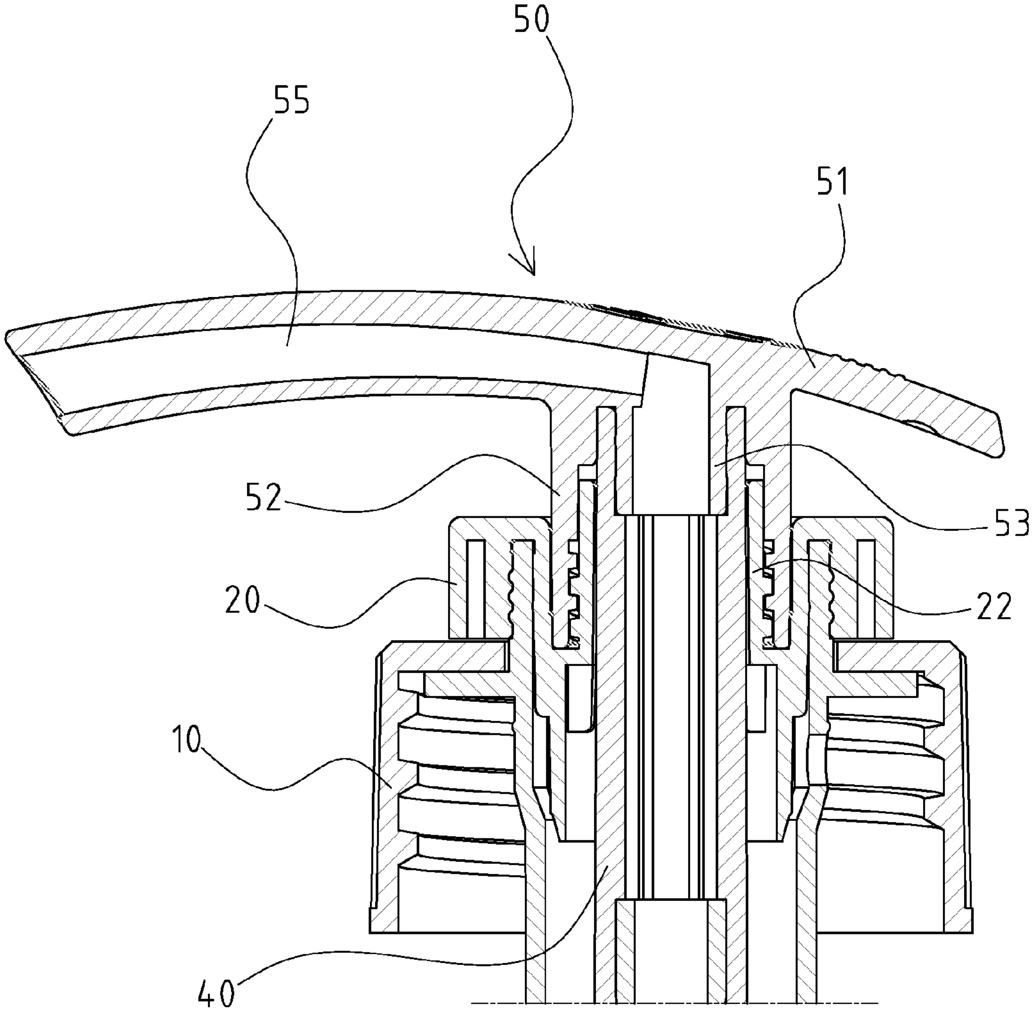
FIG. 5 is a cross-sectional view of the liquid soap dispenser in FIG. 4.
Figure 6:
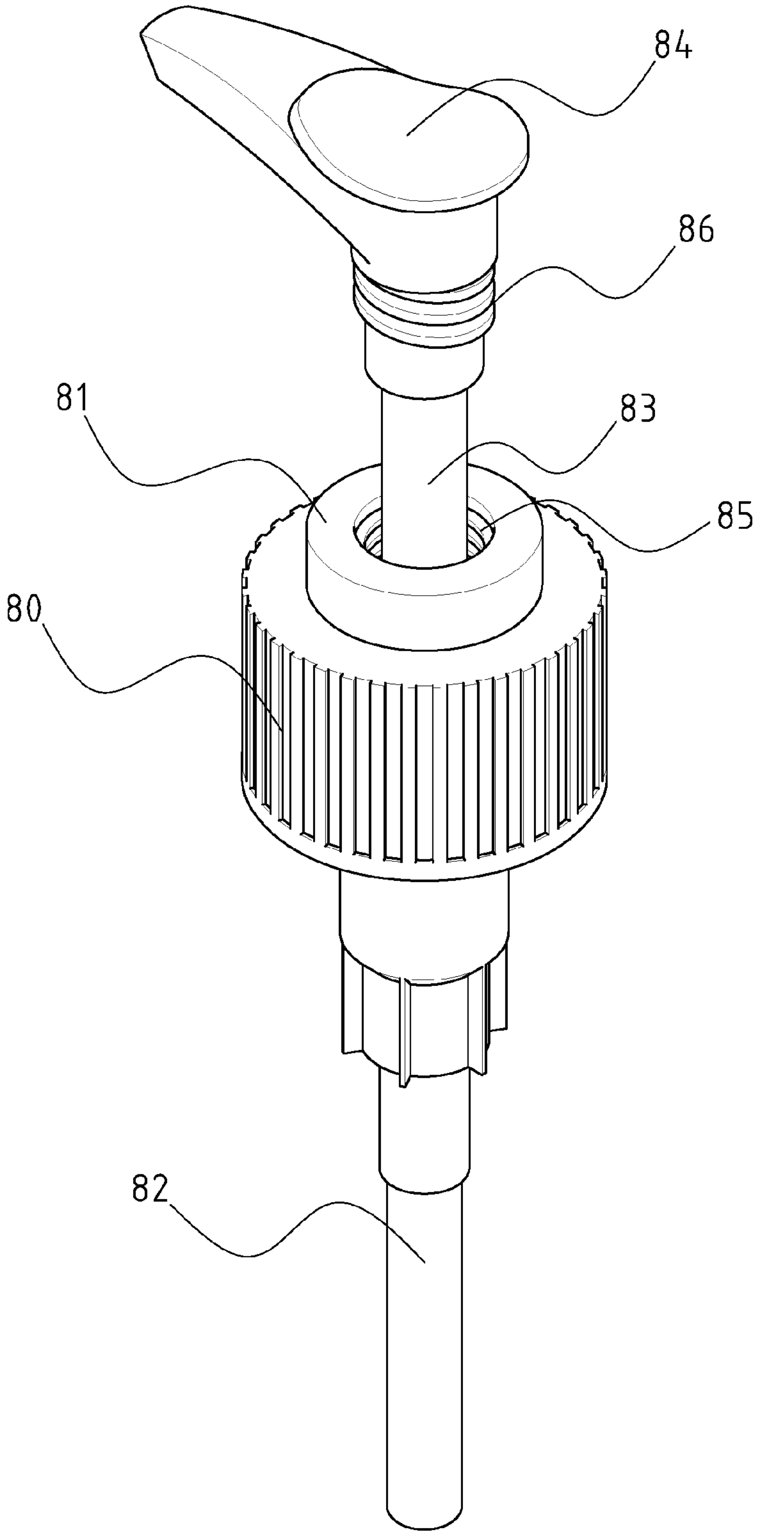
FIG.6 PRIOR ART
FIG. 6 is a perspective view of a conventional liquid dispenser in accordance with the prior art.
Figure 7:
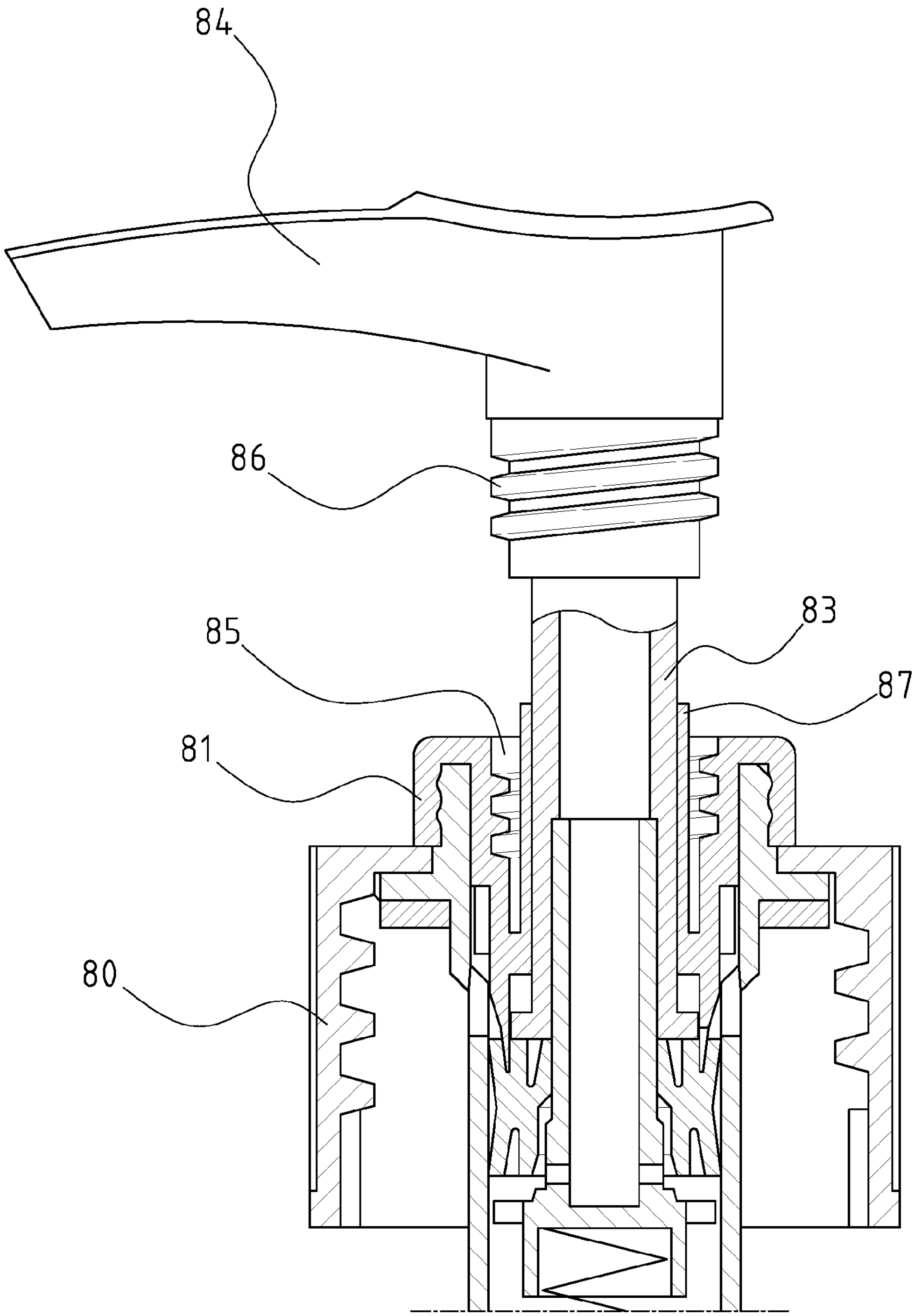
FIG.7 PRIOR ART
FIG. 7 is a cross-sectional view of another conventional liquid dispenser in accordance with the prior art.
Figure 8:
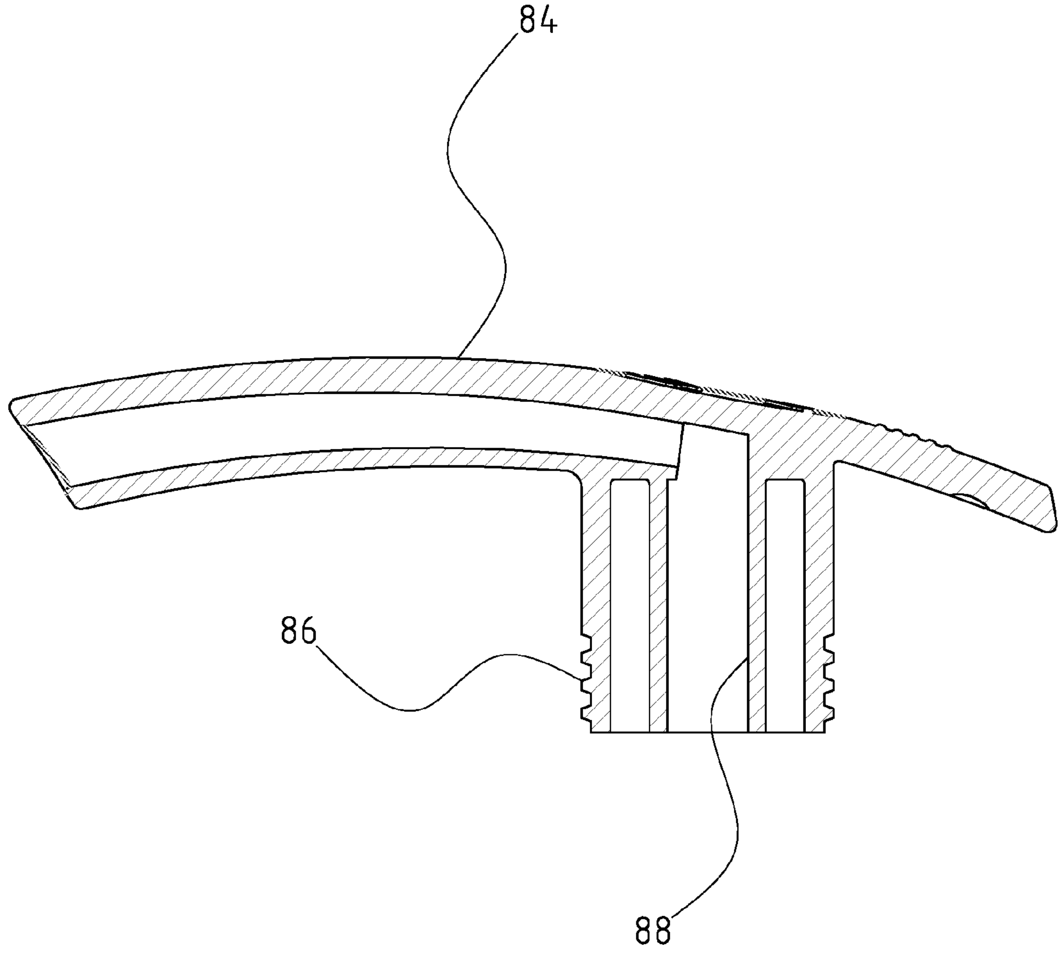
FIG.8 PRIOR ART
FIG. 8 is a cross-sectional view of a push-button of the conventional liquid dispenser as shown in FIG. 7.

The push-button 50 includes a press portion 51. A hollow stub 52 and a connecting tube 53 respectively co-axially extend from a bottom surface of the press portion 51, wherein the hollow stub 52 has a diameter greater than that of the connecting tube 53 and an extending length longer than that of the connecting tube 53 such that an altitude difference H is formed between the hollow stub 52 and the connecting tube 53. An inner threaded portion 54 is peripherally formed on an inner periphery of the hollow stub 52 within the altitude difference H, wherein the inner threaded portion 54 is selectively screwed onto the outer threaded portion 23 for positioning the push-button 50 on the top of the cylinder 20, as shown in FIGS. 4 and 5. The coupled ends of the connecting tube 53 and the discharge tube 40 is connected to each other. In the preferred embodiment of the present invention, the connecting tube 53 is partially inserted into the discharge tube 40 for longitudinally connecting the connecting tube 53 and the discharge tube 40. The push-button 50 includes a dispensing passage 55 defined in the press portion 51 and communicating with the connecting tube 53 for dispensing liquid soap, and the like.

The liquid soap dispenser in accordance with the present invention retains the functions of waterproof and selective connection between the push-button 50 and the cylinder 20. The liquid soap dispenser in accordance with the present invention further comprises the following advantages due to the altered connecting structures between the push-button 50 and the cylinder 20. The length of the connecting tube 53 is shortened relative to the conventional liquid dispenser such that the space in the hollow stub 52 is enlarged. Consequently, the inner threaded portion 54 can be formed on the inner periphery of the hollow stub 52 during injection molding. As a result, the manufacturing processes of the liquid soap dispenser on accordance with the present invention are simplified. In addition, whether the push-button 50 is connected to the cylinder 20 or not, the operator sees no connecting structures, such as the outer threaded portion 86 of the conventional liquid dispenser. Consequently, the liquid soap dispenser in accordance with the present invention provides a complete outward appearance and promotes a good visual effect thereof. Furthermore, the outer threaded portion 23 and the inner threaded portion 54 of the present invention are hidden such that the connecting structures between the cylinder 20 and the push-button 50 shall not be broken due to an improper impact during transporting or operating.

Although the invention has been explained in relation to its preferred embodiment, it is to be understood that many other possible modifications and variations can be made without departing from the spirit and scope of the invention as hereinafter claimed.

I claim:

1. A liquid soap dispenser comprising:

a cap adapted to be mounted onto a container for closing an opening defined in the container, a cylinder longitudinally and rotatably extending through the cap, a tube longitudinally connected to a lower end of the cylinder, a discharge tube partially longitudinally received in the cylinder, the discharge tube having a lower end received in the cylinder and formed with a piston, wherein the piston abuts against an inner periphery of the cylinder and is reciprocally moved relative to the cylinder, a push-button mounted onto a top of the discharge tube, a negative pressure relative to the space in the container intermittently formed in the cylinder such that the liquid soap in the container sequentially passes through the tube, the discharge tube and the push-button when the push-button is reciprocally pressed and the piston of the discharge tube is reciprocally moved relative to the cylinder, wherein:

the cylinder includes a cavity defined in a top thereof and a tubular structure co-axially extends from a bottom of the cavity, wherein a top of the tubular structure has a level height greater than that of the top of the cylinder, an outer threaded portion formed on the tubular structure;

the discharge tube extends through the tubular structure and an outer periphery of the discharge tube abuts an inner periphery of the tubular structure; and the push-button includes a press portion, a hollow stub and a connecting tube respectively co-axially extending from a bottom surface of the press portion, wherein the hollow stub has a diameter greater than that of the connecting tube and an extending length longer than that of the connecting tube such that an altitude difference is formed between the hollow stub and the connecting tube, an inner threaded portion peripherally formed on an inner periphery of the hollow stub within the altitude difference, wherein the inner threaded portion is selectively screwed onto the outer threaded portion for positioning the push-button on the top of the cylinder, the coupled ends of the connecting tube and the discharge tube connected to each other, the push-button including a dispensing passage defined in the press portion and communicating with the connecting tube for dispensing liquid soap.

2. The liquid soap dispenser as claimed in claim 1, wherein the connecting tube is partially inserted into the discharge tube for longitudinally connecting the connecting tube and the discharge tube.

* * * * *